Oct. 16, 1962 R. BILBEISI 3,058,636
LUGGAGE CARRIER
Filed March 21, 1960

INVENTOR.
RAY BILBEISI

United States Patent Office 3,058,636
Patented Oct. 16, 1962

3,058,636
LUGGAGE CARRIER
Ray Bilbeisi, Santa Clara, Calif.
(1426 Kimberly Drive, San Jose 24, Calif.)
Filed Mar. 21, 1960, Ser. No. 16,253
4 Claims. (Cl. 224—42.07)

This invention relates to luggage racks and more specifically to improvements in luggage racks for use on motor vehicles.

The luggage compartment of the modern car, though large, is seldom adequate to meet all needs. One solution to this problem is to install a rack on top of the car roof. Such racks are awkward to use due to their location and are also apt to upset the natural stability of the vehicle. I have overcome the problem by providing a luggage rack which slidably locates over the trunk of the car.

It is therefore a primary object of this invention to provide a luggage rack which locates over the trunk of a car and which may be moved while fully loaded to enable access to be made to the trunk.

It is a further object of this invention to provide a luggage rack of the above class which when extended enables ready access to be made to all sections of the rack.

It is a still further object of this invention to provide a luggage rack for a passenger car which is detachable and may be installed without modification to the car body work.

It is yet a further object of this invention to provide a luggage rack of the above class which is rugged in construction and efficient in operation and may be mounted above the trunk of all popular makes of American cars.

The invention consists of a luggage rack formed by a rectangular frame which surrounds a wire mesh base. The sides of the frame are provided with outwardly directed C channels and the ends thereof have upstanding guard rails.

A rack holder comprises two inwardly directed C channels which locate on the fenders of the car on each side of the centrally disposed car trunk. The channels of the holder and rack are disposed adjacent each other and are provided with interlocking bearings which enable the rack to roll lengthwise between the holder channels. Removable clamping means secure the holder to the car body and extendible legs selectively project from the end corners of the rack for the purpose of support by the ground when the rack is extended rearwardly of the car for loading and unloading purposes.

A full understanding of the details of the invention, together with further advantages, will become apparent by reference to the following detailed description of a preferred embodiment thereof, taken in conjunction with the attached drawings wherein:

FIG. 6 is a fragmentary view showing the construction of the rack slide bearings.

Similar reference characters indicate corresponding parts throughout the several views in the drawing.

Figure 1:
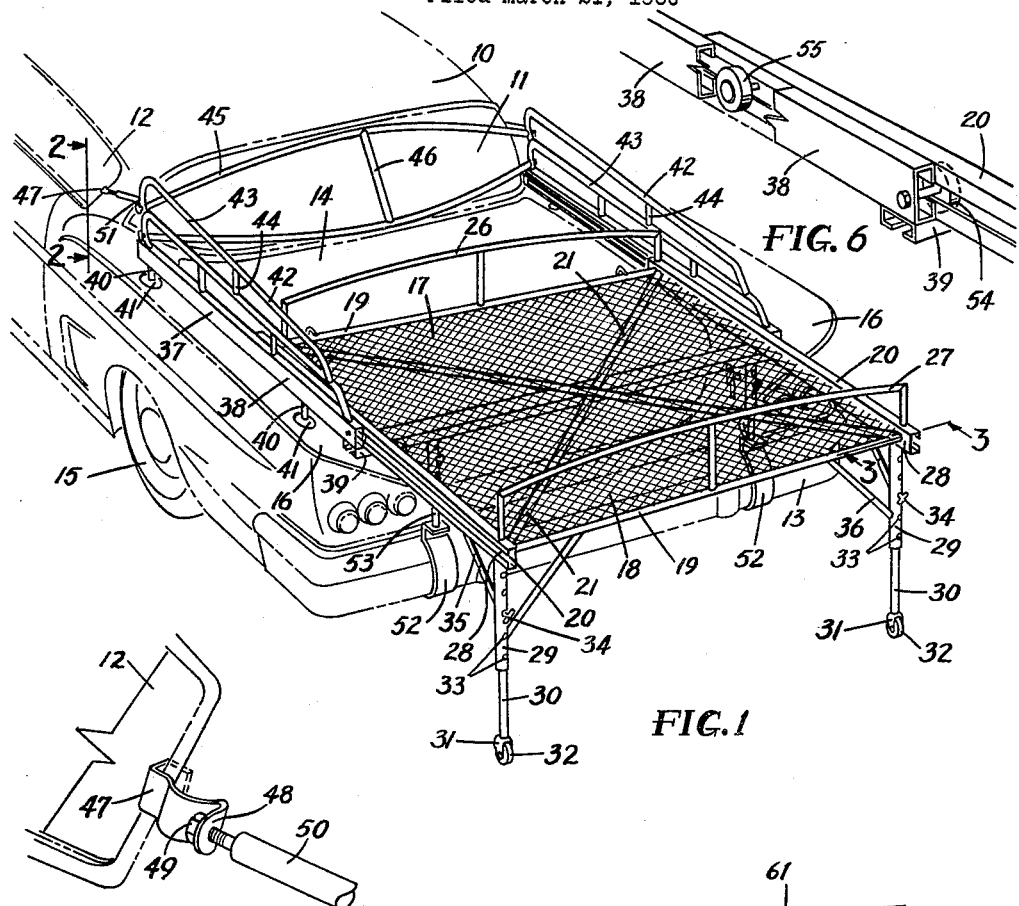
FIG. 1 is a perspective view of a passenger car taken from the rear and showing the rack of my invention mounted above the trunk and partially extended for loading purposes.
Figure 2:
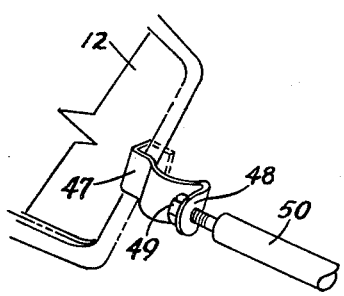
FIG. 2 is a fragmentary view taken along the line 2—2 of FIG. 1 and shows a preferred method of securing the forward ends of the rack to the rear side window recesses.
Figure 4:
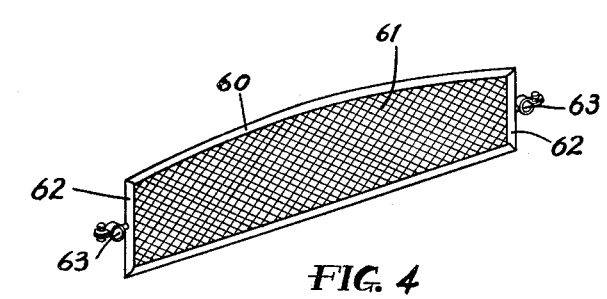
FIG. 4 is a view of a sliding partition wall which may be used in conjunction with the rack.

Referring now to the drawing in detail, the numeral 10 represents the rear end of a passenger car having a rear window 11, side window opening 12, a rear bumper 13, and a trunk lid 14. The car is provided with rear wheels 15 and rear fenders 16 of conventional design.

Figure 3:
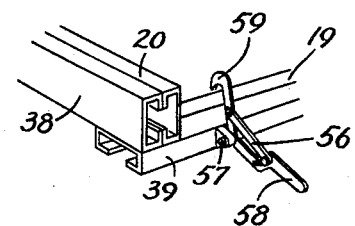
FIG. 3 is a fragmentary view partly in cross section taken along the lines 3—3 of FIG. 1 and showing the rack frame construction at the corner.
Figure 5:
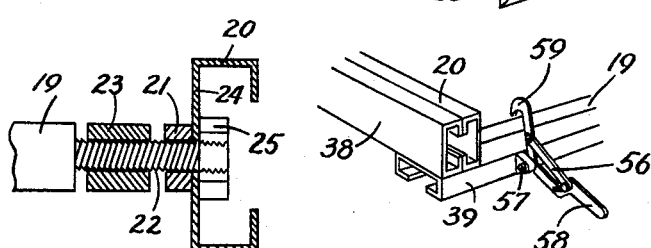
FIG. 5 is a perspective view showing the method of locking the rack in a retracted or travelling position.

A rack 17 comprises a rectangular steel mesh screen 18 which is bounded on each end by tubular members 19 and along each side by outwardly directed C-shaped channel members 20. Diagonal bracing strips 21 extend beneath the screen 18 between opposite corners of the frame to provide rigidity to the rack. Each corner of the frame, best seen in FIG. 3, is constructed by providing an extending threaded boss 22 at each end of the tubular members 19. An adapter comprises a tube 23, which may be of varying length to permit adjusting the width of the rack, is received on each boss 22 followed by the drilled ends of the bracing strips 21. The channel members 20 have suitable holes drilled through a vertical side 24 to engage on the boss 22. A nut 25 is threadably secured on the end of the boss and tightens thereon to form a rigid rack framework. Upstanding in a vertical plane from the tubular members 19 are forward and rear luggage guard rails 26 and 27 respectively. Hingedly secured beneath each rear corner 28 of the rack 19 are tubular legs 29 which are adapted to support the rack when in an extended position. The legs 29 have extensions 30 which terminate with bifurcated ends 31 adapted to receive suitable rubber wheels 32 for engagement with the ground. Holes 33 drilled in the tubular legs 29 provide interlocking adjustment with the extensions 30 by means of a locking pin 34. Bracing supports 35 and 36 extend between the legs 29 and the side and ends of the frame. These supports are conveniently hinged to the frame and removably engage with the legs so as to permit the legs to be retracted and folded beneath the rack when not in use.

A rack holder and support 37 comprises two inwardly directed C channel members 38 which are located in a spaced apart parallel relationship along the top of opposite fenders 16. The rear ends of the members 38 are connected to each other by a downwardly directed C channel bar 39 which locates rearwardly of the end of the trunk lid 14. The channel members 38 are supported near each end by tubular supports 40 which terminate in rubber suction cups 41 adapted to releasably engage with the upper surface of fenders 16. Extending upwardly from the top of the channel members is a tubular side wall structure 42 having parallel rails 43 separated by vertical spacers 44. This structure provides side walls for the rack 17 when in position for travelling. The forward ends of the channel members 38 and the side walls structure 42 are connected by a bowed tubular cross frame 45 which is adapted to embrace and protect the car rear window 11. The bowed frame 45 is provided with a central spacing member 46.

The rack holder is removably secured to the car at each end. At the forward end, U-shaped clips 47 are adapted to engage in the glass receiving recesses disposed in the rear side window openings 12. The extending ends 48 of the clips are adjustably secured by a nut 49 which is threaded onto the end of a rod 50. The other end of the rod is rigidly secured at 51 to the forward ends of the rails 43. The rear end of the holder and support 37 is secured to the rear bumper 13 by two hook shaped straps 52 adapted to embrace the outer surface of the bumper and extend thereunder. An adjustable tie bar 53 extends between the upper end of the strap and is secured to the underside of the channel bar 39. As the bar is shortened in length by means such as a screw adjustment, the channel bar 39 is drawn downwardly toward the bumper 13 and is restrained by the tubular support 40 and suction cups 41 which are in engagement with the top of the fender.

The rack side channel members 20 are adapted to slide adjacent the rack holder channel members 38, and such relationship is maintained by two wheel bearings 54 and 55 (FIG. 6) disposed on each side of the rack. The bearing 54 is secured at one end to the rear end of the channel 38 and extends therefrom for rolling engagement within the adjacent rack channel 20. The second bearing 55 is secured to the forward end of the rack side channel 20 and extends outwardly therefrom for rolling engagement within the rack holder channel member 38. In this way, the rack is supported at four points and is free to roll throughout the complete length of the channels, such that when rolled outwardly in a fully extended position the trunk lid 14 of the car may be opened without obstruction.

The rack 17 is moved to its innermost position for travelling such that the rear tubular frame member 19 is disposed in a vertical plane above the channel bar 39 of the rack holder structure. The rack is locked in this position by two clamping catches 56 which are pivotally secured to outwardly extending lugs 57 projecting from the side of the channel bar 39. The catch is provided with a lever 58 connected with mechanical advantage to a hooked leg 59 adapted to engage over the frame member 19.

A luggage divider 60 which contains a mesh screen 61 has upstanding end frame members 62 which are provided with outwardly extending tubular clamps 63. These clamps are adapted to slidingly engage along opposite parallel rails 43 of the rack supporting structure. The divider enables small quantities of luggage to be effectively retained in a forward or rearward section of the rack.

From the foregoing, it is believed that the construction, operation and advantages of this invention will be fully apparent. However, since numerous modifications will occur to those skilled in the art, it is not desired to limit the construction exactly to that shown and described, and accordingly, modifications and equivalents may be resorted to, falling within the scope of the appended claims.

I claim:

1. A luggage rack and holder for passenger cars, comprising, a rectangular rack having opposite sides formed with outwardly directed C channels and upstanding guard rails projecting from each end, a rack holder formed by two inwardly directed C channels removably located along the top surface of opposite rear fenders of a car and disposed outwardly of the sides of a trunk lid located on the car, tubular side walls extending upwardly from each inwardly directed C channel, bearings extending from said inwardly directed C channels and adapted to roll within said outwardly directed C channel of said rack, further bearings extending from said outwardly directed C channels and adapted to roll within said inwardly directed C channels of said rack holder such that said rack may freely roll between and in a horizontal plane formed by said inwardly directed C channels of said holder, extendible legs secured beneath one end of said rack for selective engagement with the ground, clamping means for securing said rack holder to said car and further clamps for selectively locking said rack from moving with respect to the rack holder.

2. A luggage rack and holder according to claim 1 wherein the rectangular rack is provided with a wire mesh base and diagonal bracing strips extending beneath said base between corners formed by the rack, and wherein an adapter comprising a tube is mounted between each rack end and the connecting outwardly directed C channel sides for the purpose of adjusting the assembled width of the rack.

3. A luggage rack and holder according to claim 1 wherein the clamping means for securing the rack holder to the car comprises, clips extending forwardly from the ends of the tubular side walls for engagement in rear side window openings of the car, suction cups having upstanding supports depending from beneath the inwardly directed C channels of the holder, and downwardly extending hook shaped straps for engagement beneath the rear bumper of the car adjustably secured beneath a channel bar connecting the rear ends of the inwardly directed C channels of the holder.

4. A luggage rack and holder according to claim 3 wherein said further clamps comprise hooks for engaging over the rack ends connected by levers with mechanical advantage pivotally secured to lugs extending from the rear side of said channel bar.

References Cited in the file of this patent

UNITED STATES PATENTS

| | | |
|---|---|---|
| 1,733,007 | Dahl | Oct. 22, 1929 |
| 2,284,419 | Greig | May 26, 1942 |
| 2,387,779 | Strauss | Oct. 30, 1945 |
| 2,464,979 | Hyatt | Mar. 22, 1949 |
| 2,502,781 | Erickson | Apr. 4, 1950 |
| 2,545,269 | Ford | Mar. 13, 1951 |
| 2,848,148 | Kutz | Aug. 19, 1958 |

FOREIGN PATENTS

| | | |
|---|---|---|
| 354,259 | Great Britain | Aug. 4, 1931 |